Patented Jan. 18, 1944

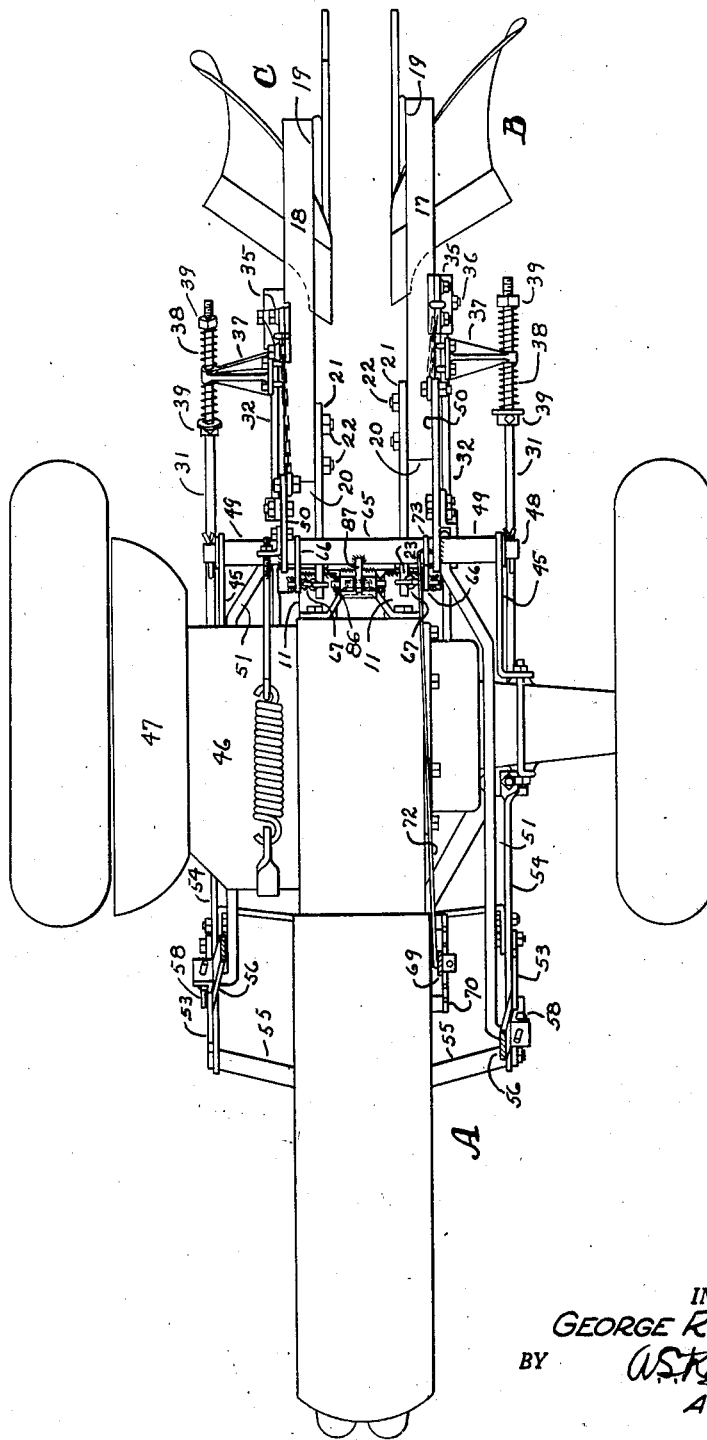

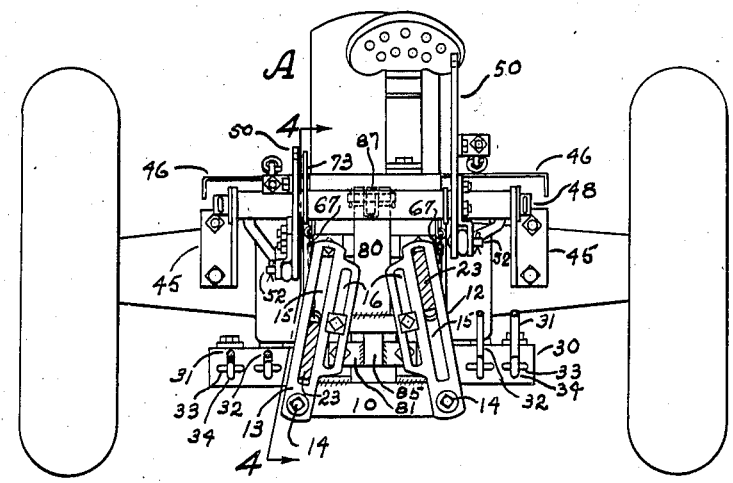
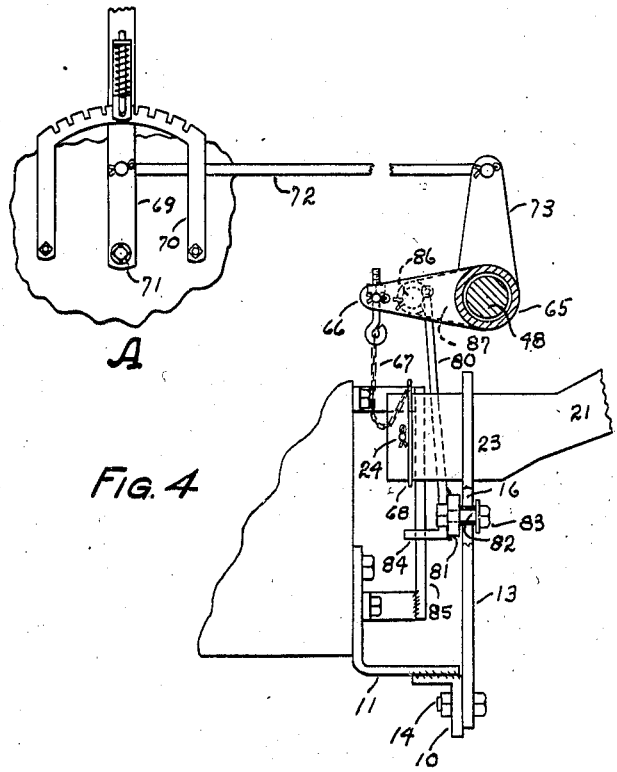

2,339,468

UNITED STATES PATENT OFFICE 2,339,468

DIRECT COUPLED TWO-WAY PLOW

George Ross Ego, Brantford, Ontario, Canada, assignor to Massey-Harris Company Ltd., Toronto, Ontario, Canada, a company of Canada Application February 27, 1942, Serial No. 432,606

5 Claims. (Cl. 97—29)

The present invention relates to two-way plows adapted to be directly connected to a tractor and has for its object improving the efficiency of devices of the kind.

Another object of the present invention is to provide a device of the kind which is simple, easily operated and easily manufactured at low cost and easily attached and detached.

One of the objects of the present invention is to provide a two-way plow wherein the individual bottoms may be easily raised and lowered without disturbing any of the other adjustments.

Another object of the present invention is to provide means whereby the mechanism may be attached to a standard tractor without disturbing the standard equipment of the tractor.

A further object of the present invention is to provide depth controlling means adapted to change the angles of the plow bottoms relative to the tractor automatically.

To these and other useful ends, my invention consists of parts, combinations of parts, or their equivalents, and mode of operation, as hereinafter set forth and claimed and shown in the accompanying drawings in which:

Fig. 2 is a top view of the device as illustrated in Figure 1.

Fig. 3 is a rear view of the device having the bottoms and their beams removed illustrating a fraction of the plates with which the bottoms are secured to the angle controlling means on the tractor, the angle controlling means and certain rods being sectioned transversely in front of the front end of the beams.

Fig. 4 is a side elevational view illustrating the angle controlling means and its connection to the depth controlling means.

Figure 1:
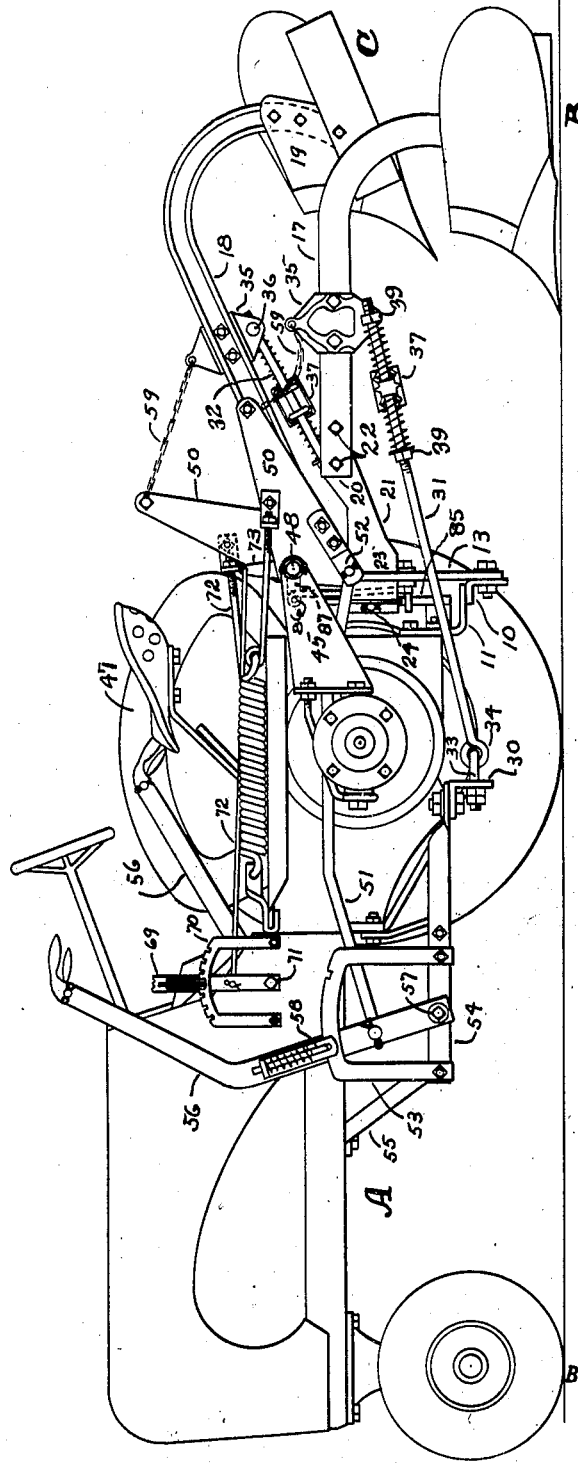
Figure 1 is a side elevational view of a tractor having my improved attachment secured thereto, the near wheel removed and illustrating the near or left hand bottom in working position and the right hand bottom in a raised position.

As thus illustrated, the tractor is designated in its entirety by reference character A and the two bottoms are designated in their entireties by reference characters B and C.

Tractor A may be conventional having a draw bar 10 which is secured to the frame of the tractor by means of transversely spaced brackets 11—11 (see Figures 1 and 2). I provide two vertically extending guide members 12 and 13 each being pivoted at its lower end to member 10 as at 14—14. Members 12 and 13 are each provided with elongated slots 15—15 and somewhat shorter slots 16—16 on the inner side of these members.

Each of bottoms B and C are provided with beams 17 and 18, the rear ends of these members being secured to conventional frogs 19—19, the forward ends of the beams differing from standard beams in that they terminate as at 20—20, each having forwardly extending plates 21—21 which are secured to the beams by bolts 22.

Plates 21 are shaped as illustrated in Figure 1, the forward ends being somewhat wider than the rear ends as at 23. These ends are of the proper thickness to be slidably engaged by slots 15 (see Figure 3), thus the angles of members 12 and 13 will determine the angle of bottoms B and C. In the forward ends of members 23 I provide bolts 24 for purposes which will hereinafter appear. The manner of holding bottoms B and C in longitudinal alignment with the tractor is as follows:

I mount on the tractor preferably somewhat in front of the vertical plane of the rear axle of the tractor a transverse bar 30 (see Figures 1 and 3). Two pairs of links comprising bars 31 and 32 are hingedly secured to member 30 by means of eye-bolts 33 which engage an eye 34 in the forward ends of these bars. Clearly the rear ends of bars 31 and 32 are free to swing horizontally and vertically with the beams. The rear ends of bars 32 hingedly engage brackets 35 as at 36. Brackets 35 are rigidly secured to beams 17 and 18.

Brackets 37 are rigidly secured to bars 32 as clearly illustrated in Figures 1 and 2, the rear ends of bars 31 slidably extending through the outer ends of these brackets.

I provide springs 38 on opposite sides of brackets 37 and members 39—39 which cause the springs to firmly contact members 37. It will be seen that bottoms B and C may swing sidewise in either direction on their beams against the pressure of the springs and that members 23 may be free enough in slots 15 to permit this movement to a limited extent.

Clearly members 37 may be adjusted longitudinally on members 32 for positioning bottoms B and C transversely and springs 38 will permit a limited side movement of either of the bottoms but these springs will tend to move the bottoms to their normal position as illustrated in Figure 2.

It will be seen that bottoms B and C may be raised and lowered as illustrated in Figure 1, that the bottoms will be held in longitudinal positions by bars 32; that is, when the bottoms are raised and lowered, they do so on members 33 as an axis.

Members 24 are positioned somewhat in front of members 13 so as to permit the necessary forward and rearward movement of the bottoms brought about by bars 32. It will be understood that one of the wheels of the tractor generally runs in the furrow. This will hold the tractor at a considerable transverse angle and the deeper the furrow the greater the angle. It is however necessary to hold the bottoms level or nearly so while in their working position. I provide means whereby the angles of the bottoms relative to the tractor are determined by the depth plowed as follows:

Brackets 45—45 are secured to the body of the tractor as clearly illustrated in Figures 1, 2 and 3. It will be noted in Figures 2 and 3 that a catwalk 46 is provided on opposite sides of the frame of the tractor to which the fenders 47 are attached. The catwalk and fender are removed on the left side of Figure 2 and the fenders are removed in Figure 3 in order to more clearly show the adjacent parts.

I provide means for lifting the plows individually, either manually or by power, preferably manually, as follows:

I rotatably mount a shaft 48 in the rear ends of members 45 and loosely mount tubes 49 on the outer ends of shaft 48 having secured to their inner ends brackets 50—50, these brackets being welded to members 49 as illustrated. Members 50 are shaped in the form of bell cranks, the depending ends being rotatably connected to the rear ends of links 51—51 as at 52—52.

Sectors 53 are suitably mounted on arms 54 on opposite sides of the frame of the tractor, the arms being anchored at their rear ends to member 30 and at their front ends to the body of the tractor by means of braces 55—55. Levers 56 are rotatably mounted on members 54 as at 57, sectors 53 having suitable notches and levers 56 having suitable engaging means 58 for the notches and other appurtenances whereby the lever may be moved and held in its forward or rear position. When the near lever 56 is in its forward position, as illustrated in Figure 1, the rear end of its member 50 will be in its lowest position and when the right hand lever 56 is moved to its rear position, as illustrated, the outer end of its member 50 will be moved to its highest position as illustrated.

I provide chains 59 of a suitable length which are attached to the rear ends of members 50 and to the upper ends of members 35. Clearly either of the bottoms may be raised and lowered by one or the other of levers 56 and when either lever is in its forward position, chain 59 will be loose as illustrated in Figure 1 and the depth of the plow will then be controlled by the height of the front end of member 21.

It will be noted that the parts in rear of members 35 are heavier than the parts in front of these members, therefore, when the rear end of a member 50 is raised the front end of the beam will be raised until member 23 contacts the top of slot 15 as shown at the right of figure 3 or in Figure 4; then a further movement of member 50 will raise the plow bottom as shown by C in Figure 1.

Clearly I have provided individual levers with which to raise and lower the bottoms, the bottoms being left free when in their operating position, the depth being controlled as follows:

Centrally positioned tube 65 is loosely mounted on shaft 48 between members 50. This tube is provided with forwardly extending arms 66—66, one at each end of the tube or substantially above members 23 and having secured at their forward ends chains 67—67, these chains being secured to the forward ends of members 23 by means of links 68.

I provide a lever 69 having a sector 70 mounted on the tractor preferably at the left side thereof, the lever being hingedly mounted on the tractor as at 71, the sector having a number of notches and the lever being provided with a suitable latch and appurtenances whereby the lever may be moved to various positions and having a link 72 which is hingedly secured to the upper end of an arm 73, the arm being rigidly secured to tube 65 by welding or otherwise.

It will be seen that tube 65 may be turned on shaft 48 by means of lever 69 and arm 66 will then be turned on shaft 48 as an axis, thus to determine the lowest position of member 23 whereby the rear tractor wheels will act to control the depth of the plows similar to the gauge wheel on the front end of a walking plow beam.

I provide a vertically arranged bar 80 having a cross bar 81 which extends a distance past slots 16 and having mounted on its ends bolts 82 which extend through slots 16. These bolts may be provided with sleeves somewhat longer than the thickness of members 13 and be held into position by nuts 83 (see Figure 4).

Member 80 is preferably bent at right angles as at 84 and is provided with a slot which loosely embraces stationary vertically arranged bar 85, the bar being anchored to the frame of the tractor at its upper and lower ends as illustrated in Figure 4. The upper end of member 80 is cutaway, the sides left curved suitable for engaging a bolt 86 (see Figure 2).

An arm 87 is secured to tube 65 and extends forwardly in the cutaway portion between the spaced curved ends of member 80 and having an aperture through which bolt 86 extends. Clearly when lever 69 is moved for changing the working position of the bottoms, the angle of the bottoms will be slightly changed to correspond with the depth because when member 80 is raised and lowered, the upper ends of members 13 will be moved toward or away from each other.

Clearly all the operator need do when he comes to the end of the field is to raise the plow that is operating out of the ground, then after he has turned the tractor, the other bottom may be dropped to its operating position as determined by lever 56 and the length of chain 67; thus the entire operation of the device is controlled by means of two raising and lowering levers and the bottoms will normally plow a level furrow.

Having thus shown and described my invention, I claim:

1. A device of the class described, comprising a tractor, transversely spaced right and left hand plow bottoms having forwardly extending beams, substantially vertically arranged forwardly extending flat members secured to the front ends of said beams, vertically arranged brackets having elongated slots and being longitudinally pivotally secured to the rear end of the tractor, said slots adapted to vertically slidably embrace said flat members, means for individually raising the rear ends of said beams and their bottoms, means adapted to manually control the angle of said brackets, manually controlled limit stops for the down movement of said flat members.

2. A device as recited in claim 1 including: an operating connection between said first and second means whereby the depth and angle of said plows may be adjusted simultaneously.

3. A device of the class described, comprising a tractor, transversely spaced right and left hand bottoms having forwardly extending beams, substantially vertically arranged members having elongated slots adapted to slidably engage the front ends of said beams and limit the upward movement thereof, said vertical members being pivoted to the tractor longitudinally, manually controlled means adapted to determine the angle of said vertical members and to limit the down movement of the front ends of said beams, manually controlled lifting means having connections to said beams forward of the center of gravity of the beams and bottoms whereby the front ends of said beams will be first lifted and then a further movement of the lifting means will lift the rear ends of the beams.

4. A device of the class described, comprising a tractor, a plow bottom having a forwardly extending beam, a vertically arranged member having an elongated slot adapted to vertically slidably engage the front end of said beam and determine the angle thereof, said vertical member being pivoted to the tractor longitudinally, a manually operated lever having means to simultaneously determine the angle of said vertical member and to limit the down movement of the front end of said beam, manually controlled lifting means having a connection to said beam forward of the center of gravity of the beam and bottom whereby the front end of said beam will be first lifted to the top of said slot and whereby a further movement of said second manually controlled means will lift the rear end of the beam.

5. A device as recited in claim 4 including: a draft link connected at its forward end to the tractor, forward of said vertical member and its rear end being connected to the plow beam in rear of the vertical member, another link positioned substantially parallel to said first link and spaced a distance therefrom, its forward end being connected to the tractor substantially transverse to said first link connection and being operatively connected at its rear end to the rear end of said first link, said last connection comprising a bracket secured to said first link and being slidably mounted on the other link, springs mounted on the other link on opposite sides of the bracket and having adjustable means whereby the rear end of the beam is spring held and optionally positioned transversely.

GEORGE ROSS EGO.